United States Patent Office 2,956,984
Patented Oct. 18, 1960

---

2,956,984

POLYESTERS FROM N,N'-BIS(CARBOXY SUBSTITUTED ORGANIC RADICAL)-P-XYLYLENEDIAMINE

Delbert D. Reynolds and Jack L. R. Williams, Rochester, N.Y., assignors to Eastman Kodak Company, Rochester, N.Y., a corporation of New Jersey No Drawing. Filed Mar. 5, 1957, Ser. No. 643,927

12 Claims. (Cl. 260—75)

This invention relates to improved linear polyesters and to the manufacture thereof and shaped articles prepared therefrom. More particularly, the invention is concerned with highly polymeric linear polyesters characterized by a regular, rather than a random, structure and containing regularly recurring amide linkages, and to methods of making such polyesters from a new type of monomeric dicarboxylic compound containing amide linkages.

A somewhat related but distinctly different application achieving similar objects was filed on April 26, 1955 by one of us (D. D. Reynolds) and Thomas M. Laakso, Serial No. 504,101. The polyesters of the present invention clearly distinguish over those of this earlier application in that these newly discovered polyesters have unexpectedly improved quenchability indices and glass transition temperatures on the order of 90° C. or higher (this is about 40° C. above those for the earlier application and considerably above that for the well known polyethylene terephthalate). Thus, the polyesters of the present invention have superior high temperature stiffness which is of utmost importance in certain film applications.

An important group of linear condensation polymers fall into two general classes, viz, the polyesters and the polyamides. The polyesters are condensation products of one or more bifunctional glycols with one or more bifunctional dicarboxylic compounds. The polyamides are condensation products of bifunctional dicarboxylic compounds with bifunctional diamines. Both broad types of condensation polymers in highly polymeric form were shown by Carothers in U.S. 2,071,250. The polyamide polymers are best typified by the nylon-type polymers, for which the advantages and disadvantages are well known. More recently, emphasis has been on development of the polyesters, and among the more widely known polymers of this type are the condensation products of terephthalic acid (usually in ester form) with a polymethylene glycol containing 2–10 methylene groups, especially ethylene glycol.

Both the polyesters and the polyamides possess certain advantages and certain disadvantages. The polyesters possess high melting points and exceptional strength characteristics, but the terephthalates are highly insoluble and very difficult to dye. An attempted modification in order to achive the desirable properties of both the polyesters and the polyamides was disclosed by Carothers and involved coreacting a dicarboxylic acid, a glycol and a diamine to form a "polyester-amide." In such a polyester-amides, however, there are the competing reactions of polyester formation and polyamide formation, and the properties of the resulting products were disappointing. An attempt to improve the properties of the polyester-amides was shown by Brubaker et al. U.S. 2,224,037 where an excess of ester was used to try to overcome the tendency for polyamide formation in preference to polyester formation. Even in this case, however, the melting points of the mixed polymers was very low and the polyester-amides known heretofore have not approached the terephthalate polyesters in utility.

In the preparation of condensation polymers, it is desirable to be able to form polymers having a sufficient inherent viscosity to achieve film and fiber-forming products with good physical characteristics. When the fiber-forming stage is reached, the polymers are capable of being extruded to form fibers or films which can be oriented by being stretched either longitudinally or laterally or both, and the oriented polymers possess unusual tensile strength, flexibility, elongation and similar physical properties.

It has been recognized that the presence of amino groups or amide linkages in condensation polymers should improve solubility, dyeability and the like, but heretofore the other properties such as softening temperature have suffered such a decline that polyester-amides have not achieved widespread commercial acceptance. Furthermore, the presence of amide linkages often results in products with undesirable color. Consequently, it has been desirable to discover some method of forming polymers which retain the desirable properties of polyesters, such as the polyethylene terephthalate esters, but which also include amide linkages effective to improve dyeability, processability, moisture absorption and the like.

It is accordingly an object of this invention to provide new and improved highly polymeric linear polyesters containing amide linkages effective to overcome the disadvantages inherent in prior polyesters without sacrificing the desirable properties characteristics of polyesters, particularly of the terephthalate type.

It is another object of the invention to prepare hitherto unknown homogeneous polyesters possessing regularly recurring polyester-amide structural units but free of the disadvantages usually associated with polyester-amides.

A further object of the invention is to employ new monomeric bifunctional dicarboxylic compound containing amide linkages equal in number to the ester groups for polyester formation with one or more aliphatic glycols.

Another object of the invention is to provide a new class of highly polymeric linear condensation polymers having physical properties at least as good as any polymers known to the art, and possessing a combination of properties not possible with polymers known heretofore.

Another object of the invention is to provide polymeric materials having unusual utility in the manufacture of shaped articles such as fibers, films, sheeting and the like, and capable of being oriented to give unusual strength, toughness, flexibility, and elasticity combined with improved dyeability, solubility, processability and moisture absorption without objectionable color formation and the sacrifice of softening temperature.

Another object of the invention is to provide polymeric materials possessing unusual utility as film base materials for the manufacture of either black-and-white or color photographic film of exceptional strength, wear resistance, high temperature stiffness and dimensional stability.

Another object of the invention is to provide new polyesters having improved quenchability characteristics, and having moisture absorption characteristics making them particularly useful for both fiber and film applications.

Other objects will be apparent from the description and claims which follow.

These and other objects are attained by means of this invention wherein highly polymeric linear condensation polymers are prepared having a regular structure composed of a succession of recurring structural units of the formula

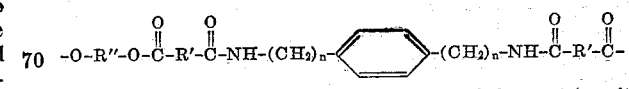

wherein each $n$ represents an integer of from 1 to 4, each R' represents a member selected from the group consisting of a polymethylene radical containing from 1 to 10 carbon atoms and a 1,4-phenlene radical, and R'' represents an aliphatic radical containing from 2 to 10 carbon atoms.

These condensation polymers can be prepared by condensing at least one aliphatic glycol of 2–10 carbon atoms, advantageously a polymethylene glycol with at least one ester of a dicarboxylic acid of the formula

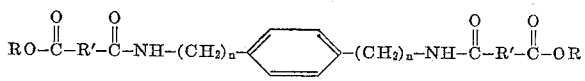

wherein each R represents an alkyl radical containing from 1 to 6 carbon atoms.

In accordance with the invention, the ester of the dicarboxylic acid whose formula is the last formula given above is prepared and used in monomeric form, whereby a completely regular structure is obtained since there are no competing polyester and polyamide reactions during the polymerization. Instead, the polymerization reaction is a polyester reaction between the bifunctional dicarboxylic compound and the bifunctional glycol, and the products obtained differ greatly from the mixed polyester-amides of random structure obtained by coreacting a glycol, dibasic acid and a diamine.

Thus, the polymers embodying the invention are readily made in viscosities sufficient for formation of fibers having the improved properties characteristic of oriented polymers, and can be made at viscosities of 0.7–1.2 and generally about 0.8 or more with no difficulty. The melting points of the polymers embodying the invention are unexpectedly high, usually being in excess of 200° C. with inherent viscosities of 0.8 or higher.

The especially preferred polyesters of this invention are those wherein $n$ is 1 and R' is a 1,4-phenylene radical. These are particularly outstanding and distinctly superior in several regards to those wherein R' represents a polymethylene radical. These especially preferred polyesters melt at above 250° C. and have elastic moduli of about $4 \times 10^4$ kg./cm.$^2$ or higher. The upper melting range compares closely to that of conventional terephthalate polyesters and is in marked contrast to the melting points of 80–150° C. which are common with previously known polyester-amides prepared by conventional methods. The polymers of the invention also possess great strength, flexibility and wear resistance comparable to the best unmodified polyesters, and in addition contain regularly recurring amide linkages which, without objectionable color formation, are effective to improve dyeability, processability, and moisture absorption. In addition, the polymers of this invention are more readily quenchable than are the terephthalate polyesters or the somewhat similar polyesters disclosed and claimed in Reynolds and Laakso, Serial No. 504,101, filed April 26, 1955.

In practicing the invention, the esters of the dicarboxylic acid of the formula

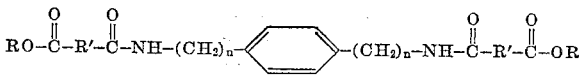

wherein R, R' and $n$ are defined above, can be prepared in any manner which will give the material in monomeric form. The nature of the ester group is not usually of great significance since it is split off in the initial ester interchange reaction with the glycol when the glycol ester is formed in the initial stages of the reaction. Thus, for example, the phenyl ester can be used, although the alkyl esters are preferred for convenience in removing the monohydric alcohol liberated in the initial ester-interchange stage of the process. Of the alkyl esters, the lower alkyl esters wherein the alkyl group contains 1–6 carbon atoms are preferred and R is defined accordingly.

The preferred method for making the monomeric esters involves reacting one molar proportion of p-xylylenediamine dihydrochloride with two molar proportions of a mono-acid chloride of a bifunctional dibasic acid mono-ester whereby the desired monomer is obtained in excellent yield. The nature of the ester group does not affect either the preparation of the monomer or the subsequent use of the monomer in the condensation polymerization. Usually the ester group is either a phenyl or an alkyl group with the lower alkyl groups being preferred for convenience, economy and ease of removal of the alcohol liberated by splitting off of the ester group during the ester-interchange occurring in the initial stage of the condensation polymerization. Thus, suitable monoacid chlorides of dibasic acid mono-esters include but are not limited to delta-carbethoxyvaleroyl chloride, 4-carbisobutoxybenzoyl chloride, delta-carbamyloxyvaleroyl chloride, 4-carbmethoxybenzoyl chloride, 4-carbhexyloxybenzoyl chloride, etc. Of course, the bromides or other halides can be used in lieu of the chlorides.

The preparation of typical dicarboxyl ester monomers used in practicing the invention is illustrated in the following examples, although it will be understood that other monomers as defined herein can be used in practicing the invention regardless of the method of preparation of such dicarboxylester monomers.

*Example 1.—N,N'-bis(delta-carbethoxyvaleroyl)-p-xylenediamine*

Forty-two grams of p-xylylenediamine dihydrochloride was stirred into 3 liters of water. Forty grams of NaOH, in 1 liter of water, was added. Stirring was continued while 76.8 g. of delta-carbethoxyvaleroyl chloride was added. After an additional twenty minutes of stirring the white product was separated by filtration and crystallized from ethanol, M.P. 150°.

*Analysis.*—Calcd. for $C_{24}H_{36}N_6N_2$: C, 64.4; H, 8.0; N, 6.2. Found: C, 64.3; H, 8.3; N, 6.2.

*Example 2.—N,N'-bis(4-carbisobutoxybenzoyl)-p-xylylenediamine*

Forty-two grams of p-xylylenediamine dihydrochloride (0.2 mole) was dissolved in 4 liters of water. The solution was stirred mechanically and 40 g. NaOH in 400 ml. water was added. A solution of 96 g. (0.4 mole) of 4-carbisobutoxybenzoyl chloride in 100 ml. of benzene was then added. The white reaction product separated as little beads. Stirring was continued for 30 minutes and the N,N'-bis(4-carbisobutoxybenzoyl)-p-xylylenediamine was separated by filtration, washed and dried (100 g.). Recrystallization from 1800 ml. dimethylformamide gave 90 g., M.P. 224° C.

*Analysis.*—Calcd. for $C_{32}H_{36}O_6N_2$: C, 70.6; H, 6.6; N, 5.2. Found: C, 70.8; H, 7.0; N, 5.3.

Other monomers suitable for use as modifiers in some embodiments of this invention but which are new compounds can be prepared as described in Examples 3 and 4 as follows:

*Example 3a.—4,4'-bis(β-bromoethyl)biphenyl*

In a 2-liter round-bottomed flask equipped with a reflux condenser and heated with a Glascol heating mantle 100 g. (0.41 mole) of 4,4'-bis(β-hydroxyethyl)biphenyl was refluxed for 16 hours with 1.5 liters of 48 percent hydrobromic acid in acetic acid. On cooling the buff-colored crystals precipitated were filtered and dried. After two crystallizations from glacial acetic acid, the white crystals melted at 120–121° C.

The yield of 4,4'-bis(β-bromoethyl)biphenyl was 119 g. or 79 percent of the theoretical value.

*Example 3b.—4,4'-bis(β-aminoethyl)biphenyl \dihydrochloride*

(1) In a 2-liter round-bottomed flask equipped with a reflux condenser and heated with a Glascol heating mantle 60 g. (0.16 mole) of 4,4'-bis(β-bromoethyl)-biphenyl was refluxed for 16 hours with 65 g. (0.35 mole)

potassium phthalimide in 500 ml. dimethyl formamide. The crystals precipitated on cooling were filtered, washed with diethyl ether, and dried.

The yield of crude light-buff-colored 4,4'-bis(β-phthalimidoethyl)-biphenyl was 76 g. or 96 percent of the theoretical value.

(2) The crude 4,4'-bis(phthalimidoethyl)biphenyl, 76 g. (0.152) mole), from (1) was refluxed with 50 g. sixty-four percent hydrazine hydrate in 500 ml. ethyl alcohol for 6 hours in a 3-liter round-bottomed flask equipped with a reflux condenser and stirrer. After cooling, the reaction product was filtered and dried. This dried crude product was refluxed with an excess of concentrated hydrochloric acid (250 ml.) in 1500 ml. of water for 5 hours. The reaction mixture was filtered hot, evaporated to one-half its original volume, and chilled. The light-buff-colored crystals were filtered and dried.

The yield of 4,4'-bis(β-aminoethyl)biphenyl dihydrochloride was 35 g. or 70 percent of the theoretical value, based on the 4,4'-bis(β-bromoethyl)-biphenyl taken.

*Example 3c.*—4,4'-bis(β-carboisobutoxybenzamidoethyl)-biphenyl

Eight grams (0.025 M) 4,4'-bis(β-aminoethyl)biphenyl dihydrochloride was dissolved in 100 ml. of water. With good stirring, 2 g. (0.05 M) sodium hydroxide in 50 ml. of water was added at once. One-half of 12.0 g. (0.056 M) p-carboisobutoxybenzoyl chloride was added, and after 20 minutes stirring, one-half of 2.0 g. (0.05 M) sodium hydroxide in 50 ml. of water was added. Twenty minutes later one-half of the remaining acid chloride was added, followed in 20 minutes by one-half of the remaining alkali solution. This process was followed until all the reactants had been added. The white product was filtered after stirring for 30 minutes and crystallized from absolute alcohol, M.P. 172–174°.

The yield of pure 4,4'-bis(β-carboisobutoxybenzamidoethyl)biphenyl was 13.2 g. or 81.5 percent of the theoretical value.

*Analysis.*—Calcd. for $C_{40}H_{44}O_6N_2$: C, 74.1; H, 6.8; N, 4.3. Found: C, 74.3; H, 7.1; N, 4.6.

*Example 4a.*—1,4-bis(β-bromoethyl)benzene

In a 2-liter round-bottomed flask equipped with a reflux condenser and heated with a Glascol heating mantle 166 g. (1 mole) of 1,4-bis(β-hydroxyethyl)benzene was refluxed for 16 hours with 2 liters of 48 percent hydrobromic acid in glacial acetic acid. The dark-buff-colored crystals were filtered and dried. After two crystallizations from diethyl ether using decolorizing carbon, the white crystals melted at 72–73° C. (Lit. 72–73°).

The yield of 1,4-bis(β-bromoethyl)benzene was 215 g. of 73.5 percent of the theoretical value.

*Example 4b.*—1,4-bis(β-aminoethyl)benzene dihydrochloride (1) Two hundred and fifteen grams (0.74 mole) of 1,4-bis(β-bromoethyl)benzene and 275 g. (1.48 moles) potassium phthalimide and 1000 ml. dimethyl formamide were refluxed for 16 hours in a 3-liter round-bottomed flask equipped with a stirrer and reflux condenser. The crystals precipitated on cooling were filtered, washed well with diethyl ether, and dried.

The yield of crude, light-buff-colored 1,4-bis(β-phthalimidoethyl)benzene was 400 g. This material is satisfactory for use in step (2).

(2) The crude product, 400 g. (0.94 mole), from (1) was refluxed with 200 g. of 64 percent hydrazine hydrate and 2000 ml. ethyl alcohol for 6 hours in a 3-liter round-bottomed flask equipped with a reflux condenser and stirrer. After cooling, the reaction product was filtered and dried. This dried, crude product was refluxed with an excess of concentrated hydrochloric acid (250 ml.) in 1500 ml. of water for 5 hours. The reaction mixture was filtered hot, evaporated to one-half its original volume, and chilled. The light-buff-colored crystals were filtered and dried.

The yield of 1,4-bis(β-aminoethyl)benzene dihydrochloride was 110 g. or 63 percent of the theoretical value based on the 1,4-bis(β-bromoethyl)benzene taken.

*Example 4c.*—1,4-bis(β-carboisbutoxybenzamidoethyl) benzene

Twenty-five grams (0.1068 mole) 1,4-bis(β-aminoethyl)benzene dihydrochloride was dissolved in 100 ml. of water. With good stirring 8.6 g. (0.213 mole) sodium hydroxide in 50 ml. of water was added at once. One-half of 52 g. (0.213 mole) p-carboisobutoxybenzoyl chloride was then added, and after 20 minutes stirring, one half of 8.6 g. (0.213 mole) sodium hydroxide in 50 ml. of water was added. Twenty minutes later one-half of the remaining acid chloride was added, followed in 20 minutes by one-half of the remaining alkali solution. This process was followed until all the reactants had been added. The white product was filtered after stirring for 30 minutes and crystallized from absolute alcohol, M.P. 215–216°.

Results similar to those described in Examples 1 and 2 can be obtained in preparing any of the other dicarboxyl ester monomers embodying the invention. In such preparing procedures the nature of the ester group or the acid halide group does not affect the course of the reaction involved in preparing the dicarboxy ester monomer. The dicarboxy ester monomers described in Examples 3c and 4c are useful, as explained hereinabove, as partial substitutes for the dicarboxy ester monomers which constitute an essential feature of the invention as illustrated in Examples 1 and 2.

The mono-acid chlorides of bifunctional dibasic acid monoesters useful in practicing the invention can be methyl, ethyl, proply, isopropyl, butyl, isobutyl or other monoesters of such mono acide halides of bifunctional dicarboxylic acids as glutaric acid (as in Example 1 above), terephthalic acid (as in Example 2 above), oxalic acid, malonic acid, dimethylmalonic acid, adipic acid, succinic acid, pimelic acid, azelaic acid, sebacic acid, suberic acid, etc. Moreover, other related acids can be dicarboxybiphenyl (also similarly employed such as 4,4'-diphenic acid), 4,4'-sulfonyldibenzoic acid, 4'-carboxyphenoxybenzoic acid, and many other acids known to be useful in other phases of the polyester art. These related compounds are useful in preparing modifiers as in Examples 3c and 4c.

Such monomers can be employed singly or in combinations of two or more of these or similar dicarboxyl ester monomers as defined herein for condensation with a glycol or glycols.

In practicing the invention, one or more of the dicarboxyl ester monomers are condensed with one or more aliphatic glycols containing 2–10 carbon atoms by heating the reaction mixture in the presence of an ester-interchange catalyst whereby a glycol diester of the dicarboxylic compound is formed in an initial stage, and this glycol ester undergoes condensation polymerization by continued heating under reduced pressure, with evolution of glycol, until the polymer reaches a fiber-forming state. The glycol can be a straight or a branched chain glycol, a cyclic glycol or mixtures of glycols.

The glycols which can be employed for reaction with the dicarboxylate monomer include the polymethylene glycols such as ethylene glycol, trimethylene glycol, tetramethylene glycol, pentamethylene glycol, hexamethylene glycol, heptamethylene glycol, octamethylene glycol, nonamethylene glycol and decamethylene glycol which can be employed singly or in mixtures of two or more, although other aliphatic glycols such as 2,2-dimethylpropanediol-1,3 otherwise known as neopentyl glycol, 1,4-cyclohexanedimethanol, and the like can be used alone or together with a polymethylene glycol. The initial stage of the process embodying the invention can be illustrated graphically as follows:

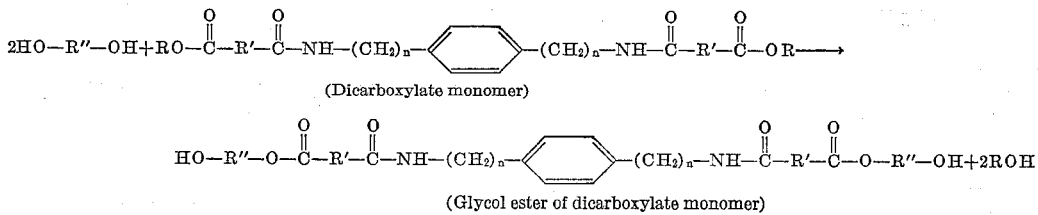

(Dicarboxylate monomer)

In this initial stage equation, each R″ represents an aliphatic group of 2–10 carbon atoms, and R is preferably a lower alkyl group but can be hydrogen, a higher alkyl group or a phenyl group as desired.

The second stage of the process embodying the invention can be illustrated graphically as follows:

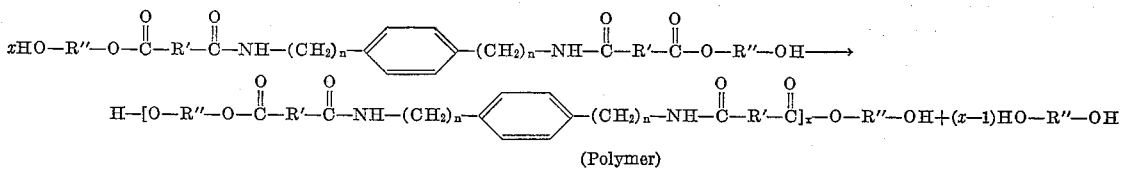

(Polymer)

wherein $x$ represents a large number sufficient to give a molecular weight well above 10,000.

Under ordinary reaction conditions, there is very little degradation of the dicarboxylate monomer and consequently the polymeric product consists predominantly of regularly recurring structural units of the formula

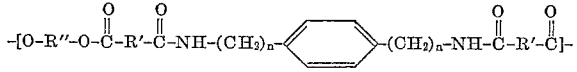

joined directly together in a linear polymer chain. This is in contrast to the random or block structure obtained by concomitant coreaction of a glycol, a dibasic acid and an amino acid or aminoalcohol where there are competing polyester and polyamide reactions. The polymer obtained has excellent quenchability in addition to excellent strength, flexibility and wear resistance, dye affinity and moisture absorption characteristics.

Consequently, it is usually neither necessary nor desirable to add a modifying dibasic acid such as terephthalic acid, isophthalic acid or the like to form a copolyester. Although such other acids, including 4,4′-sulfonyldibenzoic acid, can be used in combination with the glycol and dicarboxylate monomer, the resulting polymers usually have less desirable properties than the unmodified polymers, and such copolyesters are therefore not preferred although the use of modifying diacids, especially in preparing polymers for use as molding resins, is within the scope of this invention. Such modifiers include those novel dicarboxylic compounds described hereinabove in Examples 3c and 4c thereby giving especially useful modified polyesters.

In a similar sense it is generally not desirable to incorporate aminoacids or aminoalcohols into the reaction; however, in the preparation of molding resins and polymers having certain special utility such as for paints, varnishes, plasticizers, etc. it is sometimes desirable to employ other components during the condensation reaction. Such components include epsilon-caprolactam, 6-aminohexanoic acid, 6-aminohexanol, 12-aminododecanol and other alpha, omega-straight chain aminoalcohols.

Many of the latter compounds are not described in the literature since heretofore there has not been known any generally useful method for their manufacture. However, one of us (D. D. Reynolds) assisted by Douglas G. Borden conceived and developed a general process for preparing such aminoalcohols by the reduction of alkyl monoesters of straight chain bifunctional dicarboxylic acid monoamides employing lithium aluminum hydride as the reducing agent. For example 46 g. of ethyl sebacamate was added to 15.4 g. of lithium aluminum hydride (dissolved in 1700 ml. of anhydrous diethyl ether) which mixture was reacted 6 hours (heating when necessary under reflux conditions) followed by adding 30.6 ml. of water, filtering and purifying so as to obtained a 37% yield (13. g.) of 10-aminodecanol melting at 72–73° C. and boiling at 161° C. at 5 mm. of Hg pressure. The required ethyl sebacamate was prepared from monoethyl sebacate which was converted to the monoacid chloride (ethyl sebacoyl chloride) using thionyl chloride under reflux conditions (50°–60° C. for 1 hour) followed by adding ammonium hydroxide and ice to keep the temperature below 30° C. The 65–70% yield of ethyl sebacamate melts at 69.5–70° C. Similar techniques produce any of the alpha, omega-aminoalcohols starting with an alkyl monoester of oxalic, malonic, succinic, glutaric, adipic, pimelic, suberic, azelaic, etc. acid.

6-aminohexanol can also be prepared by first preparing epsilon-aminocaproate from commercially available epsilon-caprolactam. The latter was dissolved (339 g.) in 600 ml. of hot water and stirred with concentrated HCl (one liter) under reflux conditions (3 hours) following which water was removed by azeotropic evaporation using benzene. To the residue there was added absolute ethanol (1500 ml.) and the solution was refluxed under a Podbielniak column packed with ¼ inch glass helices and topped with a fraction cutting head and a water separator. After 50 hours under reflux 1 liter of absolute ethanol was added to the substantially anhydrous reaction mixture and it was saturated with anhydrous HCl at 10°–20° C. From this reaction mixture there was obtained (precipitated by ether) a 99% yield (580 g.) of the amino-ester hydrochloride which was then dissolved in absolute ethanol and stirred together with sodium hydroxide (123 g.) dissolved in absolute ethanol (2½ liters) at 30°–50° C. for 30 minutes. Purification yielded ethyl epsilon-aminocaproate, B.P. 66–68° C. at 0.1 mm. $N_D^{20}$ 1.4384 analyzing substantially according to theory. This product (11.95 g.) was dissolved in anhydrous ether (50 ml.) and added dropwise to a solution of lithium aluminum hydride (2 g.) in anhydrous ether (150 ml.) and stirred under a reflux condenser. Water was added (3.6 ml.) and the salts filtered off, extracted with ether, and the liquid concentrated and distilled to yield 22% of 6-aminohexanol (2.4 g.), B.P. 84–88° C. at 0.9 mm. Hg pressure and M.P. 43°–48° C. which analyzed substantially according to theory.

As discussed above, the preferred embodiments of this invention relate to homopolymers and do not utilize modifiers such as the aminoalcohols just described. However, these aminoalcohols can be employed in preparing special polymers of great value in accordance with generally recognized principles in the linear condensation polymer art in general, e.g. polyamides, polyesters, polyurethanes, etc.

In carrying out the preferred process embodying the invention, one molar proportion of the dicarboxylester monomer is reacted with at least two molar proportions of glycol. Preferably an excess of glycol is employed. The initial ester-interchange is readily effected by heating the mixture of glycol component and dicarboxylate monomer component in the present of an ester-interchange catalyst and at a temperature above the melting point of the reactants. The initial stage of the reaction is usually carried out at atmospheric pressure and at a temperature high enough to distill off the alkanol which forms as a result of ester interchange. During the course of the ester-interchange in the initial stage of the process, monohydric alcohol is liberated corresponding to the nature of the ester groups on the dicarboxylate monomer, or water is formed in those cases when the free dicarboxylic acid is used. For best results, the water or alcohol is removed from the reaction zone as it is liberated in order to shift the reaction equilibrium to optimum formation of the glycol ester of the dicarboxylate monomer. As has been indicated, the dicarboxylate monomer is desirably employed in the form of a lower alkyl diester for ease of removal of the liberated alcohol. If desired, however, higher alkyl or phenyl esters can be used, as well as the free dicarboxylic acid or an ester-forming derivative thereof such as a salt, halide or amide.

The process is facilitated by use of an ester-interchange catalyst, a large number of such catalysts being known to the art. Typical ester-interchange catalysts which can be employed include the metal hydrides such as calcium hydride, lithium hydride, sodium hydride, or the like; metal oxides such as antimony trioxide, litharge, cerium oxide, germanium oxide and the like; double metal catalysts such as lithium aluminum stearate, calcium aluminum acetate and similar catalysts containing an alkali or alkaline earth metal and an amphoteric metal, alcoholates of one or more of such metals as sodium, potassium, lithium, calcium, titanium, tin, magnesium, aluminum, zinc, and the like, alkaline reacting salts such as borates and carbonates of the alkali metals, free metals such as sodium, potassium, lithium, calcium, cobalt, tin, germanium, cerium, magnesium, tin, lead antimony and the like as well as salts of these and similar metals and other well known ester-interchange catalysts such as zirconium compounds and the like. Particularly good results are obtained with the titanium compounds such as titanium butoxide, sodium hydrogen titanium ethoxide butoxide and the like, preferably together with water as a co-catalyst for low color formation. The catalyst or catalyst mixture is preferably employed in a concentration of at least 0.001% by weight based on the weight of reactants with amounts of 0.001% to 0.05% by weight being preferred. Larger amounts of catalyst can also be used although such larger amounts usually are not necessary for optimum results.

The initial stage of the reaction is usually complete in 5–30 minutes; and, if desired, the temperature can be raised or the pressure reduced at the end of the first stage to effect completion of the removal of the alcohol liberated during the initial stage. Polymerization of the glycol ester of the dicarboxylic compound is then effected to the desired degree by continuing the heating under reduced pressure at least until the polymer reaches the fiber-forming stage. The polymerization can also be effected by first obtaining a low viscosity polymer and converting it to powder form, and then continuing the polymer build-up in powder form under vacuum.

The polymers embodying the invention are polymerized until a fiber-forming stage is achieved, i.e. until a rod dipped into the melt will pull a filament when drawn from the melt. Usually for optimum results, the polymerization is carried out until an inherent viscosity of about 0.7 or more is attained, although lower or much higher viscosities may be desired in certain cases. The polymers of the invention usually have melting points well above 200° C. The preferred polymer compositions are those having melting points in the range of about 250°–300° C. The polymers melting above about 300° C. are difficult to extrude and process in commercial practice.

As has been indicated, any one or more of the aliphatic glycols containing 2–10 carbon atoms can be condensed with any one or more of the dicarboxylate monomers as defined herein. The resulting polymers can be used alone or in blends of two or more of such polymers, or blends of such polymers with other polymeric materials such as polyesters, polyamides, copolyesters, polyesteramides and the like. In some cases, it is also desirable to modify the polymers by coreacting another dicarboxylic acid (preferably in ester form) with the glycol and dicarboxylate monomer, such other dicarboxylic acids being typified by aromatic dibasic acids such as terephthalic acid, isophthalic acid, 4,4′-sulfonyldibenzoic acid and the like or aliphatic dibasic acids such as adipic acid, sebacic acid, azelaic acid and the like. (See also Examples 3c and 4c above.) The polymers of the invention can be quenched following polymerization by cooling to a temperature below the minimum crystallization temperature, usually below 80° C. The polymerization proceeds rapidly and ordinarily the fiber-forming stage is reached within 10–30 minutes, although the time necessary for polymerization will vary depending upon the heating temperature, kind and amount of catalyst and similar variable factors. The polymerization is facilitated by removal from the reaction zone of the glycol liberated during the polymerization.

The polymers thereby obtained can be extruded from the melt to form filaments or sheets as desired. The resulting shaped articles are then oriented by being stretched either laterally or longitudinally or both whereby a marked increase in physical properties is obtained. The degree of stretching will vary somewhat depending upon the polymer composition and the properties desired, but sheets, films, fibers, etc. are usually stretched 50–600% of their original extruded dimension for best results. The shaped articles are usually cold-drawn, i.e. drawn at a temperature between the second order transition temperature and the minimum crystallization temperature of the polymer; although, unlike the usual polyesters, the polymers embodying the invention can be oriented by drawing at temperatures well above the minimum crystallization temperature in some cases.

The fibers, films, sheets, etc. which have been drawn are characterized by exceptional physical and mechanical properties, including strength, flexibility, wear resistance and the like, comparable to terephthalate polymers. In addition, the polymers of the invention have unusually high heat distortion temperatures and high temperature stiffness. The polymers of the invention thus possess the excellent melting point and physical characteristics of the best polyesters known heretofore but combine this with unusually high heat distortion temperatures, excellent dye affinity, moisture adsorption higher than that of conventional polyesters, and superior high temperature stiffness. The good heat distortion characteristics can be enhanced by heating the oriented polymer above its minimum crystallization temperature, as for example at 170° C., to cause crystallization but without the necessity of shrinking the stretched polymer as is usually the case.

In fiber applications, filaments having strength above 4–5 grams per denier can be readily obtained, combined with good dyeability and moisture absorption which usually are sacrificed in conventional polyesters. The polymers also possess excellent utility in photographic applications as for example for use as film base for carrying photosensitive silver halide emulsions in black-and-white or color film. The unusually high heat distortion temperature also makes these polymers unique for applications where dimensional stability against thermal distortion is a serious problem. The excellent high temperature stiffness characteristics are especially valuable in applications where film is being used as in a motion picture projector at high temperatures.

The polymers of the invention are of particular utility for manufacture of fibers or film support but can be used for a variety of shaped articles such as tubing, as well as sheeting for packaging, and the like. These polymers can also be used in resinous molding compositions, coating compositions, etc.

In the manufacture of film or sheeting, the polymer is desirably extruded from the melt either onto a casting roll or between paired rolls and then drawn both longitudinally and laterally, either concomitantly or successively, to from 100–600% of its original dimensions in order to orient the molecules. Thereafter, the oriented film or sheet is desirably heated at a temperature above the minimum crystallization temperature until the desired degree of crystallization results. In the case of film to be used for photographic applications where it is desirable to coat the film with photosensitive silver halide emulsions or other coating layers, the film can be coated with a subbing material, such as a resin or copolymer sub before the orientation or between the drafting steps or before the heat treatment following orientation. In some cases, particularly with modified polyester subs of good solubility, it is more convenient to sub the oriented and crystallized film after the film processing has been completed. The subbed film can then be supplied with the usual photosensitive emulsion layers, antihalation backing, etc. in accordance with well known photographic practice.

In the manufacture of fibers, the molten polymer is extruded through a spinneret and quenched. The resulting fiber is then drafted 50–600% and heat treated for crystallization. The resulting fibers have hot bar sticking temperatures above 200° C. in most cases, combined with strength of the order of at least 4–5 grams per denier, excellent die affinity for most textile dyes and moisture absorption characteristic which make the fibers resemble natural fibers more than is generally the case with synthetic polyester fibers. In contrast to the usual polyesters containing amino groups, very little color formation is observed and textiles prepared from fibers embodying the invention can be dyed to deep shades or with pastel dyes of fleeting tints as desired. Consequently, the polymers of the invention show unique versatility among the synthetic condensation polymers since they combine the desirable characteristics of both the polyesters and the polyamides without the disadvantage of either type.

The improved results obtained in accordance with the invention appear to result from the use of the particular dicarboxylester monomers of this invention, and the unusually regular structure which is obtained by condensing the glycol with the dicarboxylester monomers of this invention. In the process of the present invention, polyester formation is involved since the amide groups are not functional in the condensation. Thus, the results obtained are in marked contrast to processes where there are competing polyester and polyamide reactions which lead to a random or block structure. Such processes giving random or block structures are designated as heterogeneous polyester-amide processes, and the products obtained therefrom are usually of greatly inferior properties particularly as regards melting point, and physical and mechanical properties. In fact, the usual polyester-amides are of rather low degree of utility for fiber and film formation.

The improved results obtained in accordance with this invention are illustrated by the following examples of certain embodiments thereof, it being understood that the examples are illustrative only and not intended to limit the scope of the invention unless otherwise specifically indicated. Similar results are obtained with the other polymers embodying the invention as described herein.

*Example 5.—Condensation of N,N'-bis(4-carbisobutoxybenzoyl)-p-xylylenediamine with 1,6-hexanediol*

Fifty grams of N,N'-bis(4-carbisobutoxybenzoyl)-p-xylylenediamine, 25 g. of 1,6-hexanediol and 1 ml. of catalyst (prepared by dissolving 0.2 g. of Na in 100 ml. ethanol and then mixing with 3.0 ml. of titanium butoxide) were placed together in a round bottom flask equipped with a side arm and an inlet tube which extended to the bottom of the flask. Nitrogen was passed slowly through the inlet tube while the flask was heated in a 305° C. oil bath. This, so called first stage of the reaction, was continued for 10 minutes after isobutanol began to distill through the side arm of the flask. The nitrogen inlet tube was then replaced by a stirrer equipped with a ball and socket-type seal. The flask was evacuated (0.5 mm.) and the viscous mass stirred for 10 minutes. During this second stage of the reaction, the polymer became very viscous. Upon cooling, it crystallized to a porcelain-like mass. It has a melting point of 285° C., an intrinsic viscosity of 0.86 and a Young's modulus of $5.3 \times 10^4$. Additional runs produced polymers having moduli of 5.5 to $6.8 \times 10^4$ kg./sq. cm. Fibers and films extruded from the melt quenched very readily and were oriented by drafting about 200% and then heat set. The oriented and crystallized fibers and films had excellent flexibility and wear resistance in addition to their high strength characteristics. Fibers of this and other polymers embodying the invention have much better dye affinity than do terephthalate polyesters. Films of this and similar polymers embodying the invention can be subbed with resin subs and used as support for silver halide emulsions in both black-and-white and color photographic film with excellent results. Generally speaking, the preferred polymers of this invention (R' is p-phenylene) have superior melting points which are higher than for any of the terephthalate polyesters.

*Example 6.—Condensation of N,N'-bis(4-carbisobutoxybenzoyl)-p-xylylenediamine with 1,5-pentanediol*

In preparing the polymers of the invention, the chain length of the glycol, or the chain length of the R' group, or $n$ can be varied to give the desired physical characteristics. Forty grams of N,N'-bis(4-carbisobutoxybenzoyl)-p-xylylenediamine, 20 g. of 1,5-pentanediol and 1 ml. of catalyst (as in Example 5) were condensed according to the method described in Example 5. The first stage was run for 15 minutes at 290° bath temperature and the second stage was continued for 10 minutes at 310–315° bath temperature and 0.5 mm. pressure. The resulting polymer was readily quenched. It gave fibers which were easily cold drawn. The melting point of the crystalline polymer was 287° C. and it had an intrinsic viscosity of 0.81. The fiber modulus for various runs of this polymer was $4.1–4.8 \times 10^4$ kg./sq. cm. As with the other polymers of the invention, this material finds unusual utility in the manufacture of fibers and films of exceptional quality.

*Example 7.—Condensation of N,N'-bis(4-carbisobutoxybenzoyl)-p-xylylenediamine and N,N'-bis(4-carbisobutoxybenzoyl) - p - hexamethylenediamine with 1,6-hexanediol*

Twenty-five grams of N,N'-bis(4-carbisobutoxybenzoyl)-p-xylylenediamine, 25 g. of N,N'-bis(4-carbisobutoxybenzoyl)-hexamethylenediamine, 25 g. of 1,6-hexanediol and 2 ml. catalyst (as in Example 5) were reacted together according to the method described in Example 5. The first stage was run for 20 minutes under nitrogen at an oil bath temperature of 270° C. The second stage was continued for 15 minutes at 280° C. and 0.5 mm. pressure. The resulting polymer gave tough fibers which were easily cold drawn. It quenched readily, had a melting point of 249° and an intrinsic viscosity of 0.87.

*Example 8.—Condensation of N,N'-bis(4-carbisobutoxybenzoyl)-p-xylylenediamine and N,N'-bis(4-carbisobutoxybenzoyl) - p - hexamethylenediamine with 1,4-butanediol*

This experiment was the same as that described in Example 7 except for the facts that the 1,6-hexanediol was replaced by 1,4-butanediol and the second stage was run at 290° instead of 280. The product was similar in appearance; M.P. 267° C.

*Example 9.—Condensation of N,N'-bis(4-carbisobutoxybenzoyl) - p - xylylenediamine with 1,6 - hexanediol— Powder build-up method*

A mixture of 95 g. of N,N'-bis(4-carbisobutoxybenzoyl)-p-xylylenediamine, 45 g. of 1,6-hexanediol and 2.5 ml. of catalyst (as Example 5) was heated under nitrogen for ten minutes in an oil bath maintained at 300° C. The reaction flask was then evacuated and within five minutes the low molecular weight polymer crystallized. It was cooled and ground in a Wiley mill using a 20 mesh screen. This powder was then stirred for 1.25 hours at 0.5 mm. pressure while being heated in an oil bath maintained at 260–270° C. The white granular product has a melting point of 292° C. and an intrinsic viscosity of 0.94. The polymer was extruded to form films and fibers. After orientation by stretching about 200% below the crystalline temperature followed by heat setting, the fibers had excellent mechanical and physical properties. Films of this polyester product can be used as film base in photographic applications. In black-and-white or color photographic film, the oriented polymer shows excellent wear resistance, strength, and resistance to flex cracking. This and similar polymers exhibit unusually high stiffness at elevated temperatures which is highly desirable for motion picture film.

The amide linkages in the various monomers in accordance with the invention, are very stable under the polymerization conditions so that the content of free amine is very low in the polymers. Consequently, the problem of objectionable color formation common to polyesteramide processes known heretofore is largely obviated in the process of this invention. As can be seen from the examples, the polymerization in accordance with this invention proceeds rapidly to the fiber-forming stage which is a definite advantage from the standpoint of commercial practice. The ease of ester-interchange and condensation employing the dicarboxylate monomers herein described makes the manufacture of polymer possible by continuous as well as batch processes. Furthermore, the polymerization can be carried to any desired molecular weight and inherent viscosity with ease.

If desired, mixtures of the dicarboxylate monomers and/or the glycols can be used in practicing the invention. The use of mixtures may be desirable when a short chain glycol is used, since the short chain compounds tend to give higher melting polymers than may be desired for ease of melt extrusion in commercial practice.

Although Examples 5 through 9 illustrate some of the preferred embodiments of this invention, the following example shows the value of those polymers where R' in the general formula is a polymethylene radical.

*Example 10.—Condensation of N,N'-bis(delta-carbethoxyvaleroyl)-p-xylylenediamine with 1,4-butanediol*

A mixture of 15 grams of N,N'-bis(delta-carbethoxyvaleroyl)-p-xylylenediamine, 10 g. of 1,4-butanediol and 0.3 ml. of catalyst (prepared by dissolving 0.2 g. of sodium in 100 ml. of ethanol and then adding 3 ml. of titanium butoxide) was heated for 20 minutes under nitrogen in an oil bath maintained at 265–270° C. A stirrer assembly was then attached to the reaction flask and the reaction mixture was stirred at 0.5 mm. pressure and at 270–275° C. for 20 minutes. The polyester amide thus formed was easily cold drawn to exceptionally strong, somewhat elastic fibers. The intrinsic viscosity was 0.89 and the M.P. 208° C.

Similar polymers can be prepared by condensing N,N'-bis(alpha-carbethoxyactyl)-p-xylylenediamine and other related homologs with ethylene glycol, 1,5-pentanediol, 1,4-butanediol and 1,6-hexanediol.

The course of the reaction is not significantly altered by using varying concentrations of any of the well-known ester-interchange catalysts, or by using any of the esters of the dicarboxylate monomers as described herein.

Thus, by means of this invention, a new class of highly useful polymers are provided which are of particular utility in the manufacture of fibers, films and sheeting. The examples illustrate the unique combination of properties possessed by the polymers of the invention, and similar results are obtained with the other polymers within the scope of the invention as described herein. By means of this invention, it is possible to obtain in a single polymer the advantageous characteristics of both the polyesters and the polyamides.

Various preferred embodiments have been illustrated above; however, as already indicated there are various related dicarboxyl ester monomers which can be employed in preparing modified polymers and which also have some value in forming homopolymers as illustrated in the following examples where the polymerizations were carried out essentially as described above in Example 5.

*Example 11*

1,4 - bis($\beta$ - p - carboisobutoxybenzamidoethyl)benzene 5.73 g. (0.01 mole).

Nonane-1,9-diol, 4.8 g. (0.03 mole).

Catalyst: 0.2 ml. of sodium hydrogen titanium ethoxide butoxide solution.

Stage I:
  10 minutes, 250°; clear melt gradually soldified
  10 minutes, 275°; solid did not remelt
  10 minutes, 275–310°; remelting began at 300°, complete at 310°.

Stage II:
  30 minutes, 310° (0.12–0.4 mm.).

Product had intrinsic viscosity of 0.24; M.P. 246°; it was a brittle light-brown solid.

*Example 12*

Charge and cataylst: As in Example 11.

Stage I:
  20 minutes, 305°; clear melt
Stage II:
  10 minutes, 305°; (0.12–0.15 mm.)

Product was insoluble, M.P. 245°; it was a semicrystalline, tough, amber polymer.

*Example 13*

4,4' - bis($\beta$ - p - carboisobutoxybenzamidoethyl) biphenyl 6.49 g. (0.01 mole).

Nonane-1,9-diol, 4.8 g. (0.03 mole).

Catalyst: As in Example 11.

Stage I:
  20 minutes, 305°; amber melt
Stage II:
  17 minutes, 305°; (0.12–0.15 mm.).

Product was insoluble, M.P. 245°; it was a rubbery, dark-amber glass.

Example 14

N,N' - bis(p - carboisobutoxybenzoyl)hexamethylene diamine 8.2 g. (0.016 mole).
1,4 - bis(β - p - carboisobutoxybenzamidoethyl)benzene 2.29 g. (0.004 mole).
Hexane-1,6-diol, 14.2 g. (0.12 mole).
Catalyst: 0.4 ml. of sodium hydrogen titanium ethoxide butoxide solution.

Stage I:
  20 minutes, 260–275°; pale yellow melt
Stage II:
  20 minutes, 275°; (0.07–0.2 mm.).

Product had an intrinsic viscosity of 0.98, M.P. 247°; it was a light tan, tough, crystalline solid.

Example 15

Dimethyl terephthalate, 3.10 g. (0.016 mole).
4,4' - bis(β - p - carboisobutoxybenzamidoethyl)biphenyl 2.60 g. (0.004 mole).
Hexane-1,6-diol, 14.2 g. (0.12 mole).
Catalyst: 0.2 ml. of sodium hydrogen titanium ethoxide butoxide solution.

Stage I:
  20 minutes, 245–275°; clear, yellow melt
Stage II:
  20 minutes, 275°; (0.1–0.3 mm.).

Product had an intrinsic viscosity of 0.68, M.P. 190°; it was an orange-tan, semicrystalline solid.

The products described in Examples 11–15 are generally crystalline, have high melting points, high modulus and good quenchability. These polymers are very stable at the temperature required for their preparation. They are especially valuable when used as modifiers of the preferred dicarboxylic ester monomers of this invention so as to produce copolymers having particularly advantageous combinations of properties.

Although the invention has been described in detail with particular reference to certain preferred embodiments thereof, it will be understood that variations and modifications can be effected within the spirit and scope of the invention as described hereinabove and as defined in the appended claims.

We claim:

1. A linear highly polymeric polyester of (A) from 70 to 100 mole percent of a nitrogenous dicarboxylic acid having the following general formula

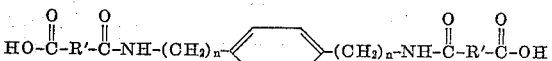

wherein each $n$ represents an integar of from 1 to 4 and each $R'$ represents a member selected from the group consisting of a polymethylene radical containing from 1 to 10 carbon atoms and a 1,4-phenylene radical and from 0 to 30 mole percent of another dicarboxylic acid capable of forming a copolyester and (B) at least one glycol having the following general formula

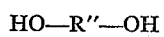

wherein $R''$ represents an aliphatic hydrocarbon radical containing from 2 to 10 carbon atoms, said polyester being characterized by having a melting point of at least 200° C. and an intrinsic viscosity of at least 0.7.

2. A polyester as defined by claim 1 which is essentially a homopolymer wherein (A) is N,N'-bis(4-carboxybenzoyl)-p-xylylenediamine, which polyester is characterized by a melting point of at least 250° C.

3. A polyester as defined by claim 2 wherein (A) is N,N'-bis(4-carboxybenzoyl)-p-xylylenediamine and (B) is 1,6-hexanediol, which polyester melts at about 285° to about 292° C.

4. A polyester as defined in claim 2 wherein (A) is N,N'-bis(4-carboxybenzoyl)-p-xylylenediamine and (B) is 1,5-pentanediol, which polyester melts at about 287° C.

5. A fiber of the polyester defined by claim 1.
6. A fiber of the polyester defined by claim 2.
7. A fiber of the polyester defined by claim 3.
8. A fiber of the polyester defined by claim 4.
9. A film of the polyester defined by claim 1.
10. A film of the polyester defined by claim 2.
11. A film of the polyester defined by claim 3 having a Young's modulus in the range of about $5.3$–$6.8 \times 10^4$ kg./cm.$^2$
12. A film of the polyester defined by claim 4 having a Young's modulus in the range of about $4.1$–$4.8 \times 10^4$ kg./cm.$^2$

References Cited in the file of this patent
UNITED STATES PATENTS

| | | |
|---|---|---|
| 2,547,113 | Drewitt | June 4, 1953 |
| 2,766,221 | Lum et al. | Oct. 9, 1956 |
| 2,766,222 | Lum et al. | Oct. 9, 1956 |